May 7, 1946.

I. R. TREVISAN

Re. 22,753

KNOTLESS PACKAGE TIE

Original Filed Dec. 11, 1943

Inventor

ITALO RAYMOND TREVISAN

By George W. Reiber

Attorney

Reissued May 7, 1946

Re. 22,753

UNITED STATES PATENT OFFICE 22,753

KNOTLESS PACKAGE TIE

Italo Raymond Trevisan, Newark, N. J.

Original No. 2,371,920, dated March 20, 1945, Serial No. 513,980, December 11, 1943. Application for reissue September 20, 1945, Serial No. 617,656

3 Claims. (Cl. 224—57)

The present invention relates in general to package for bundle ties and more particularly to a package handle adapted to tighten and secure the package binding in a knotless tie.

The use of handles secured to package bindings for the purpose of carrying is well known. One of the familiar handles of this type is hooked onto the binding after the latter is tightened and securely tied by a knot.

In unwrapping a package thus bound, it is first necessary to untie, break or cut the binding. This step in the procedure of unwrapping is often tedious and frequently results in injuries such as chafing of the fingers in attempting to break the binding, or cutting due to slippage of a knife used in severing it.

It is an object of the present invention to avoid these inconveniences and possible injuries by providing a package handle with means for tightening and securing the binding without tieing a knot therein.

Another object of the invention is to provide a handle of the character described with means for hooking the binding whereby the package may be supported and carried.

A further object of the invention is to provide such a handle with means for maintaining the tie securely until it is desired to remove the handle and binding from the package.

The operation of removing the handle and binding from a package thus secured is simple, requiring merely the removal of the handle which simultaneously releases the binding.

Numerous other objects and advantages of the invention will be apparent as it is better understood from the following description which, taken in connection with the accompanying drawing, discloses a preferred embodiment thereof.

Figure 1:
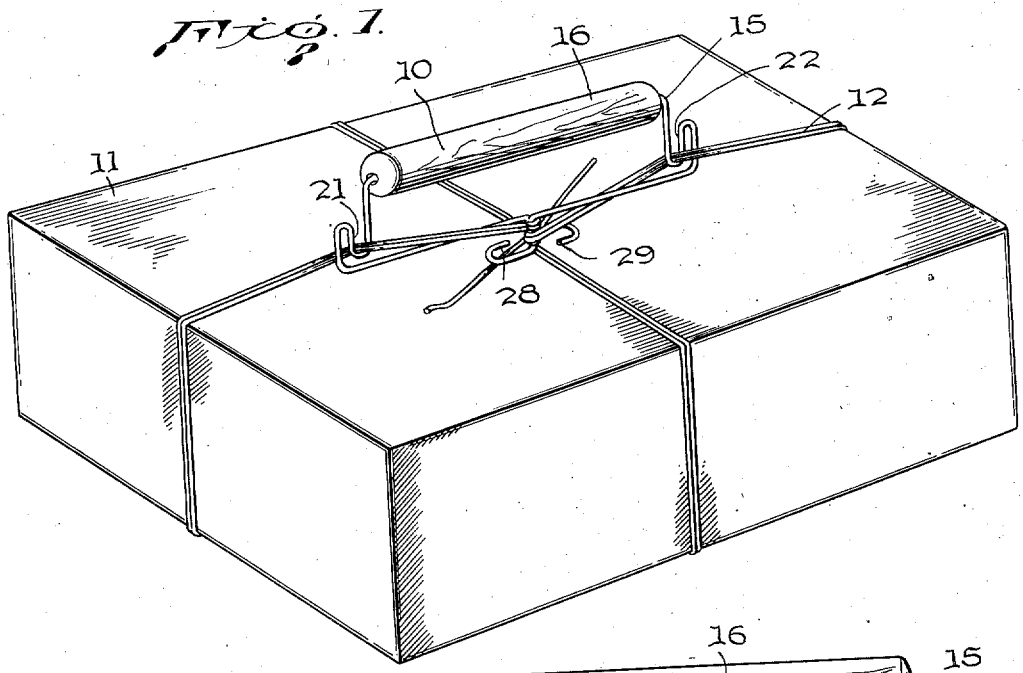
Fig. 1 is a perspective view of a package provided with a handle embodying the present invention.
Figure 2:
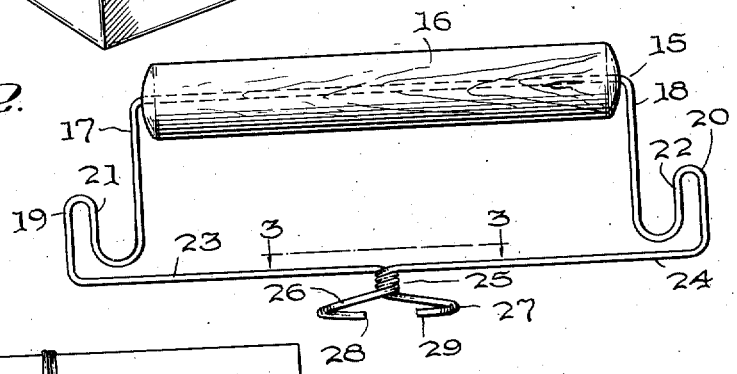
Fig. 2 is a side elevational view of the handle.

Referring to the drawing, the numeral 10 designates generally a package handle embodying one form of the present invention.

The handle shown comprises two parts, a wire portion 15 and a wooden or fibrous hand grip 16 threaded onto the wire to protect the hand in carrying. The grip 16 may, of course, be dispensed with in some instances, or may form an integral part of the handle in other embodiments of the invention.

The wire 15 may be a continuous length bent downwardly at 17, 18 adjacent the ends of grip 16 thence upwardly and downwardly in outwardly extending reverse or S-shaped bends 19, 20 to form support or carrying hooks 21, 22. From these extremities, the wire is bent inwardly in lengths 23, 24 substantially in parallel alignment with the grip and unite in a downwardly formed intertwining spiral gripping post 25.

The spiral shown in the drawing is left-hand, but a right-hand spiral is sometimes desirable. I use the term spiral in its broadest sense throughout this specification and claims. Furthermore, it is to be understood that roughening or corrugating the post 25 for the purpose of gripping the binding is contemplated by the invention. And the mere use of a material for the post which provides a sufficiently high coefficient of friction between it and the binding would likewise be within the meaning of the term "gripping" as used herein, even though the post may be made smooth on its binding-engaging surface.

Figure 3:
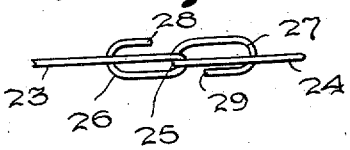
Fig. 3 is a plan view taken at 3—3 in Fig. 2.

The two ends of the wire 15 which extend beyond the spiral 25 are shaped to form a pair of oppositely disposed tightening and tying hooks 26, 27 which take the form of an elongated S as shown in Figs. 1 and 3, with the leading points or ends 28, 29 preferably on a slightly lower plane than that of the central portion of the S formation.

Figure 4:
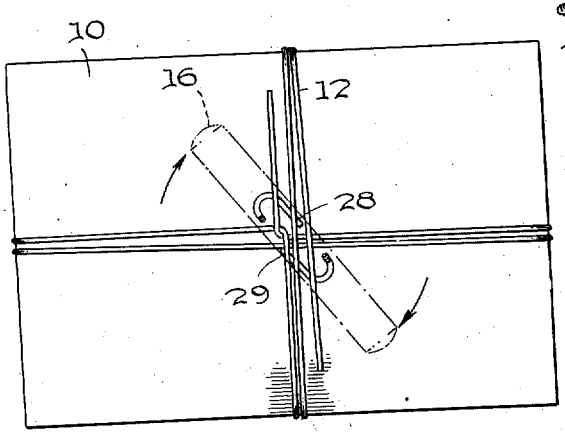
Fig. 4 is a plan view of a package and binding to which the handle is about to be applied.

Fig. 4 illustrates the first step in tightening and tying a binding 12 on a package utilizing the above described handle 10. The binding is first wrapped around the package, leaving the ends of the binding free. The binding need not be tight before the hooks are inserted under it as shown in Fig. 4 because, after the hooks are thus positioned, turning the handle in the direction indicated by arrows in Fig. 4 and about a vertical axis through the spiral 25 will result in twisting the binding around the spiral which both tightens and ties the binding effectively. The support hooks 21, 22 are then hooked onto the binding thereby locking the binding in its tightened and tied condition on the spiral and also providing means for carrying the package.

When the load of the package strains at the binding, the strands of the binding surrounding the post or spiral 25 are forced into more intimate contact with each other and with the spiral thereby increasing the frictional engagement between the overlapped portions, of binding on binding and/or binding on post and increasing the security of the tie.

To release the handle from the package binding, the hooks 21, 22 are first withdrawn from engagement with the binding and the handle is then turned counterclockwise, as viewed in Fig. 4, to unwind the binding from the post 25. This single unwinding operation loosens and unties the binding which may then be readily removed from the package.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A knotless tying device comprising a gripping post, hooks radially disposed adjacent an end of said post and adapted to gather portions of a binding to be tied, including the loose ends of said binding, and to initiate the wrapping of said gathered binding around said post when the device is rotated, thereby forming a knotless tie in said binding, locking hooks spaced from said post for engaging portions of the binding, and a handle whereby said device may be gripped and the package supported, said locking hooks serving both to support the package by its binding and also to maintain the security of said knotless tie.

2. A knotless tying device comprising a wire binding-engaging element, a gripping post formed from two portions of said wire, hooks extending from an end of said post and adapted to gather portions of a binding to be tied, including the loose ends of said binding, and to initiate the wrapping of said gathered binding around said post when the device is rotated, thereby forming a knotless tie in said binding, locking hooks spaced from said post for engaging portions of the binding, and a handle whereby said device may be gripped and the package supported, said locking hooks serving both to support the package by its binding and also to maintain the security of said knotless tie.

3. A knotless package tie comprising, a wire binding-engaging element, a gripping post formed in said wire, said post comprising laterally bent opposed portions of said wire, and hook portions formed in said wire adjacent the end of said post and adapted to gather a binding to be tied, including the loose ends of said binding, and to initiate the wrapping of said gathered binding around said post when the device is rotated, thereby forming a knotless tie in said binding, locking hooks spaced from said post for engaging portions of the binding and a handle whereby said device may be gripped and the package supported, said locking hooks serving both to support the package by its binding and also to maintain the security of said knotless tie.

ITALO RAYMOND TREVISAN.